United States Patent [19]

Boysen

[11] 4,047,047

[45] Sept. 6, 1977

[54] PULSE GENERATOR

[75] Inventor: Mogens Bredal Boysen, Copenhagen, Denmark

[73] Assignee: 4K - International A/S, Copenhagen, Denmark

[21] Appl. No.: 479,497

[22] Filed: June 14, 1974

[51] Int. Cl.² ........................................... H03K 3/00
[52] U.S. Cl. ............................................... 307/106
[58] Field of Search ................. 307/106; 235/61.11 E; 250/219; 310/DIG. 3; 324/173, 175, 179; 318/653

[56] References Cited

U.S. PATENT DOCUMENTS

| 3,189,886 | 6/1965 | Sonntag | 318/653 |
| 3,249,744 | 5/1966 | Anstey et al. | 307/106 |
| 3,456,499 | 7/1969 | South | 324/173 |
| 3,619,569 | 11/1971 | Hoehn | 235/61.11 E |
| 3,686,507 | 8/1972 | Krytz et al. | 307/106 |
| 3,710,246 | 1/1973 | Herring | 324/179 |
| 3,716,699 | 2/1973 | Eckert, Jr. et al. | 235/61.11 E |
| 3,751,636 | 8/1973 | Coles, Jr. | 235/61.11 E |

OTHER PUBLICATIONS

Brookman et al., "Magneto-Lyminescent Device" *IBM Tech. Bulletin* vol. 3, No. 2, July 1960 p. 71.

*Primary Examiner*—David Smith, Jr.
*Attorney, Agent, or Firm*—Spencer & Kaye

[57] ABSTRACT

A pulse generator for measuring the rotational angle of a shaft has a driven member which is connected to the shaft and is thus movable by the latter and which includes an endless track carrying a plurality of encoded periodic wave signals. A sensor head continuously senses the signal intensity at successive locations along the track as the driven member is moved by the shaft. The sensor head generates an output voltage which characterizes the encoded signals and which is applied to a trigger circuit. The latter generates a signal pulse each time the voltage exceeds a predetermined threshold value.

8 Claims, 3 Drawing Figures

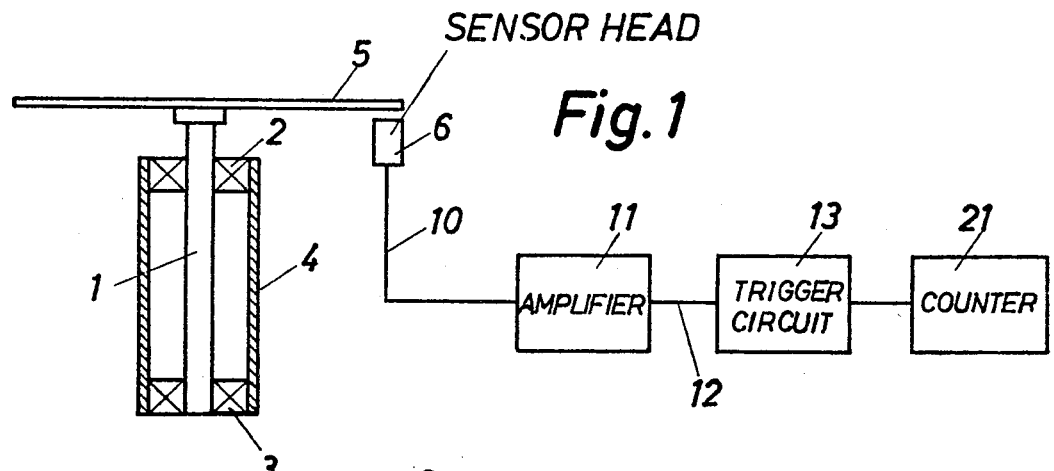
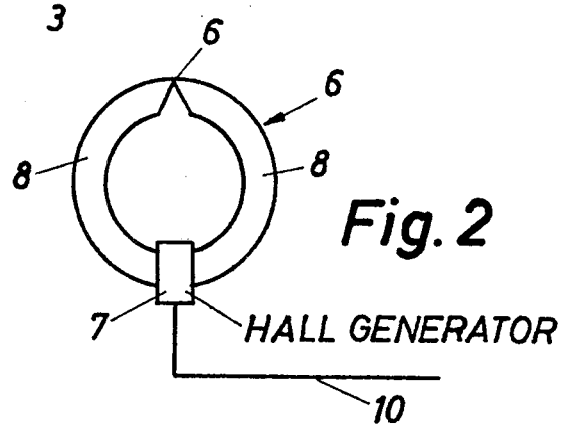
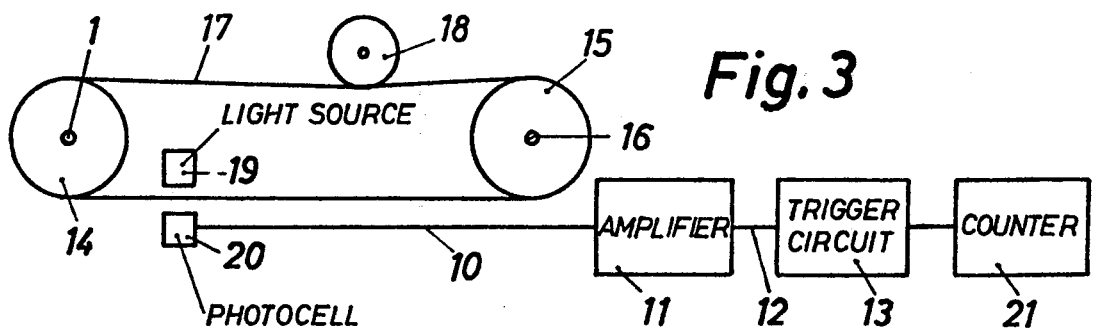

PULSE GENERATOR

BACKGROUND OF THE INVENTION

The present invention generally relates to a pulse generator for measuring the magnitude of angular displacement (angle of rotation) of a shaft.

The angle of rotation of a shaft is measured in many different devices, particularly in devices for measuring the number of revolutions of a shaft in an odometer or speedometer, in counters for liquids, etc. In gasoline stations, for example, the gasoline drawn from the reservoir actuates a pump to drive a shaft whose rotational angle is proportional to the quantity of gasoline dispensed. The shaft may perform two revolutions, for example, for each liter of gasoline dispensed. In the conventional gasoline station pumps the shaft drives a counter which indicates the quantity of gasoline dispensed and/or the price to be charged for this quantity.

The manufacture of such a mechanical counter is expensive. Moreover, a counter of this type requires substantial space and frequent adjustments for maintaining the prescribed accuracy. Also, recalibrations necessitated by changes in price are quite complicated. When small quantities of fluid are dispensed, for example at a low pump speed, the measuring accuracy is often unsatisfactory because the torque acting on the shaft is so small that it is unable to overcome the friction in the counter.

German Pat. No. 831,022 discloses a counter for a gasoline pump in which the shaft drives a disc whose edges are provided at regular intervals with permanent magnets which generate electrical pulses in a coil by induction as the shaft rotates. In order to assure that such an electrical signal transmission between the shaft and an electronic counter is accurate within 1-2 ml, either the disc diameter should be large enough to accommodate about 500 permanent magnets in even distribution over the circumference of the disc, or an appropriate transmission ratio must be provided between shaft and disc. An adherence to the first condition has the result that the pulse generator requires substantial space, while the latter solution requires a complicated and expensive transmission mechanism. It is another drawback of the pulse generator disclosed in the above-mentioned German patent that its effect is based on the measurement of a change in flux. With low pumping speeds the change in flux may become so small that the generated signal is too weak to be sensed, which leads to similar erroneous measurements as with the purely mechanical counters.

SUMMARY OF THE INVENTION

It is an object of the invention to provide an improved pulse generator of the above-mentioned type which is able, for example, to measure or register, as the case may be, quantities of liquid with the required accuracy even at the lowest pump speeds approximating zero, which has small spatial requirements and is inexpensive to manufacture.

This and other objects to become apparent as the specification progresses are accomplished by the invention, according to which, briefly stated, the pulse generator has a driven member which is connected to the shaft (whose rotational angle is to be sensed) and is thus movable by the latter and which includes an endless track carrying a plurality of encoded periodic wave signals. A sensor head continuously senses the signal intensity at successive locations along the track as the driven member is moved by the shaft. The sensor head generates an output voltage which characterizes the encoded signals and which is applied to a trigger circuit. The latter generates a signal pulse each time the voltage exceeds a predetermined threshold value. Thus a pulse is emitted for every periodic wave.

It is thus apparent that the sensor head does not measure a change in the intensity of the encoded periodic signal but the momentary signal intensity itself, even when the shaft is brought to a stop.

The driven member can be a circular disc which is coated with a magnetizable material and which is oriented at a right angle to the shaft and fastened concentrically thereto. The marginal zone of the disc carries, along an endless track, a plurality of circumferentially evenly distributed periodic wave signals. These signals are encoded in a known manner by magnetic recording. The sensor head may be a Hall generator with a pole shoe which sets the magnetic field at a right angle to the Hall generator by means of an air gap. Such a disc having a diameter of only 70 mm can contain without difficulty 500 periodic wave signals which is sufficient to accomplish the desired accuracy if the shaft executes two revolutions for every liter of fluid dispensed. The Hall generator, in a known manner, senses the magnetic field and emits a voltage signal which is proportional to the intensity of the magnetic field. The voltage is applied to a trigger circuit which, in response, emits pulses in the manner discussed above.

The driven member according to the invention may, however, also be constituted by a transparent film which is modulated by partial darkening with the continuous sequence of identical signals. In such a case the sensor head is preferably a photocell. In this embodiment of the pulse generator the film is illuminated in a known manner by a lamp. The intensity of light penetrating the film and impinging on the photocell at each point on the film characteristics the encoded signal intensity at that particular location of the endless track. The electric voltage output of the photocell is, similarly to the voltage generated with a magnetically encoded disc of the previously outlined embodiment, applied to an electric circuit which emits a pulse whenever the voltage magnitude exceeds the given threshold value.

The trigger circuit according to the invention may be a Schmitt trigger. The use of a Schmitt trigger is particularly expedient because it emits a certain output signal whenever the latter lies within certain limits. Stated differently, the Schmitt trigger has a "window" with an upper and a lower limit. Such a circuit is well suited to detect each periodic wave even if a noise signal is superposed on the useful signal.

BRIEF DESCRIPTION OF THE DRAWINGS

FIG. 1 is a schematic illustration, including a block diagram, of a preferred embodiment of the invention.

FIG. 2 is a schematic view of a sensor head incorporated in the embodiment illustrated in FIG. 1.

FIG. 3 is a schematic illustration, including a block diagram, of another preferred embodiment of the invention.

DESCRIPTION OF THE PREFERRED EMBODIMENTS

Turning now to FIG. 1, a shaft 1, whose angle of rotation is to be measured, is rotatably mounted in bearings 2 and 3 within a stationary pipe 4 leading, for example, to the pump of a gasoline station. The shaft 1 rotates in proportion to the quantity of fuel dispensed by the gasoline pump. A driven member, formed to a circular disc 5 which is coated with a magnetizable material, is concentrically fastened to shaft 1. The plane of the disc is at a right angle to the shaft axis.

A plurality (for example 500) of periodic wave signals (for example of sinusoidal form) are encoded (recorded) along an endless track on the disc. The endless track may extend, for example, along the rim zone of the disc concentrically with respect to the disc center and thus the shaft axis. As the disc 5 is rotated by the shaft 1, a sensor head 6 disposed adjacent the rim zone of the disc 5, senses the encoded signals and emits, in response, electrical voltage signals whose intensity and direction are a measure for the momentary flux which, in turn, characterizes the state of magnetization of that location on the disc which is momentarily within the sensing range of the sensor head. The voltage signals emitted by the sensor head are thus also sinusoidal.

Turning now to FIG. 2, the sensor head 6 includes a Hall generator 7 with a pole shoe 8 which orients the magnetic field at a right angle to the Hall generator by means of an air gap 9, having a width of about 1/10 mm. The distance between the air gap 9 and the disc 5 is about 5/100 mm. The signal emitted by the sensor head 6 is applied through a conductor 10 to an amplifier 11 (which may be of the multistage type) where the sinusoidal voltage is amplified. From the output of the amplifier the signal is transmitted through a conductor 12 to a trigger circuit 13 which emits a pulse whenever the intensity of the input signal exceeds a given threshold value. Thus a pulse is emitted for every cycle of the sine voltage. The circuit 13 is preferably a Schmitt trigger, the square wave output pulses of which can be fed in a known manner to an electronic counter 21 which may be calibrated to indicate, for example, the quantity and/or price of the fuel dispensed.

Turning now to the embodiment illustrated in FIG. 3, two spaced end rollers 14 and 15 support a driven member formed of an endless film belt 17 made of a material transparent to light. The end roller 14 is keyed to the shaft 1 which in function and structure corresponds to the shaft 1 of the previously described embodiment. The end roller 15 idles on a shaft 16. The film 17 is, along an endless track coextensive with the length dimension of the belt, encoded with a plurality of periodic wave signals. These signals are constituted by differently and periodically darkened locations to constitute a recording of, for example, an endless series of sine waves. In order to ensure a slippage-free travel of the film 17 on the driving disc 14, the latter is provided with sprockets (not shown) which engage sprocket holes (also not shown) in the film. A spring-charged tensioning roller 18 provides the appropriate film tension. A light source 19 illuminates one side of the film while a sensor head, formed as a photocell 20 disposed on the opposite side of the film converts the light modulated by the signals encoded on the film into a sinusoidal electrical voltage which is transformed, in the manner described in connection with FIG. 1, into square pulses at the frequency of the sine voltage.

It is to be noted that features of the above-described two embodiments are interchangeable. Thus, it is feasible to provide a magnetic encoding on an endless belt rather than on a circular disc 5 as described in connection with the first embodiment. Conversely, it is feasible to provide a transparent disc with modulated transparency rather than an endless film belt 17 as described in connection with the second embodiment.

The pulse generator of the present invention is of course not limited to use in gasoline pumps. It may find application wherever the angle of rotation of a rotatable or turnable shaft or axle of any desired design is to be measured.

It will be understood that the above description of the present invention is susceptible to various modifications, changes and adaptations and the same are intended to be comprehended within the meaning and range of equivalents of the appended claims.

I claim:
1. A pulse generator for measuring the rotational angle of a rotatably supported shaft member comprising:
  a. a driven member including a magnetizable endless track forming an integral, direct surface portion of said driven member;
  b. recorded signal means carried on said endless track; said recorded signal means being formed of a plurality of recorded sinusoidal signals distributed along said endless track; said sinusoidal signals being constituted by different states of magnetization of the different locations on said endless track;
  c. means connecting said driven member to said shaft member for moving said driven member by said shaft member to an extent proportional to the rotational angle of said shaft member;
  d. means for continuously scanning successive locations of said endless track for generating a signal as a function of the flux of the magnetic field generated by the different states of magnetization of successive points on said endless track;
  e. signal processing means for continuously and successively sensing the generated signal for forming a voltage signal having a course corresponding to said generated signal and for emitting a signal pulse each time said voltage signal exceeds a threshold value; and
  f. counter means for counting said signal pulses.

2. A pulse generator as defined in claim 1, wherein said signal processing means includes a Schmitt trigger for generating said signal pulse.

3. A pulse generator as defined in claim 1 wherein said driven member is a circular disc; said endless track being carried by and on said disc; said endless track being concentric with said disc.

4. A pulse generator as defined in claim 3, said circular disc being affixed to said shaft member in a concentric and perpendicular relationship with respect to said shaft member.

5. A pulse generator as defined in claim 1 wherein said meand for continuously, includes a Hall generator, a pole shoe connected to said Hall generator and means defining an air gap in said pole shoe to orient said magnetic field perpendicularly with respect to said Hall generator.

6. A pulse generator as defined in claim 1 wherein said driven member is an endless belt supported by end rollers, said endless track being carried by and on said endless belt; said endless track being coextensive with the length dimension of said endless belt.

7. A pulse generator as defined in claim 6 wherein one of said end rollers is affixed to said shaft member.

8. A pulse generator for measuring the rotational angle of a rotatably supported shaft member comprising:

a. a driven member including an endless track made of a light-transparent material;
b. recorded signal means carried on said endless track; said recorded signal means being formed of a plurality of recorded sinusoidal signals distributed along said endless track; said sinusoidal signals being constituted by differently darkened locations on said endless track;
c. means connected said driven member to said shaft member for moving said driven member by said shaft member to an extent proportional to the rotational angle of said shaft member;
d. means for continuously scanning successive locations of said endless track for generating a signal represented by said recorded sinusoidal signals; said means for continuously scanning including a light source adjacent one face of said endless track to sense the light emitted by said light source and modulated by said sinusoidal signals on said endless track;
e. signal processing means for continuously and successively sensing the generated signal for forming a voltage signal having a course corresponding to said generated signal and for emitting a signal pulse each time said voltage signal exceeds a threshold value; and
f. counter means for counting said signal pulses.

* * * * *